United States Patent [19]

Ottesen et al.

[11] Patent Number: 5,270,880
[45] Date of Patent: Dec. 14, 1993

[54] PREDICTIVE READ-WRITE INHIBIT DECISION USING FUZZY LOGIC

[75] Inventors: Hal H. Ottesen, Rochester, Minn.; Arun Sharma, New Rochelle; Muthuthamby Sri-Jayantha, Ossining, both of N.Y.

[73] Assignee: International Business Machines Corporation, Armonk, N.Y.

[21] Appl. No.: 866,687

[22] Filed: Apr. 10, 1992

[51] Int. Cl.$^5$ .............................. G11B 15/04
[52] U.S. Cl. ................... 360/60; 360/55; 360/77.02; 369/54
[58] Field of Search ............ 360/60, 55, 77.02; 369/54

[56] References Cited

U.S. PATENT DOCUMENTS

| | | | |
|---|---|---|---|
| 4,554,652 | 11/1985 | Maeda et al. | 369/44 |
| 4,730,290 | 3/1988 | Takasago et al. | 369/32 |
| 4,839,751 | 6/1989 | Revels | 360/60 |
| 4,930,084 | 5/1990 | Hosaka et al. | 364/426.04 |
| 4,954,907 | 9/1990 | Takita | 360/78.07 |

OTHER PUBLICATIONS

Fuzzy Logic by Lofti A. Zadeh, Apr. 1988 with IEEE, pp. 83–92.
U.S. Fuzzy Logic Comesout of the Closet by R. Colin Johnson, Electronic Engineering Times 1991 pp. 19 & 76.
Fuzzy Logic Simplifies Complex Control Problems by Tom Williams, Mar. 1991 with Computer Design, pp. 90–100.

Primary Examiner—Edward K. Look
Assistant Examiner—Michael S. Lee
Attorney, Agent, or Firm—Baker, Maxham, Jester & Meador

[57] ABSTRACT

A method for predicting and avoiding data errors by predicting disk drive read-write inhibit requirements in response to at least two parameters including a head position error and velocity with respect to the track centerline. A write or read inhibit signal is generated in response to selected combinations of these parameters to minimize soft read errors arising from track misregistration and to avoid hard errors arising from overwriting data recorded in an adjacent track. The read and write inhibit strategy is described as a pair of linguistic control rules suitable for implementation in a Fuzzy Logic Controller.

14 Claims, 5 Drawing Sheets

FUZZY SET = INHIBIT

FIG. 5 PRIOR ART

W = INHIBIT WRITE
R = INHIBIT READ

| HEAD VELOCITY | I | PL | PM | PS | ZE | NS | NM | NL | I |
|---|---|---|---|---|---|---|---|---|---|
| PL | WR | W |  |  |  |  |  | W | WR |
| PM | WR | W |  |  |  |  |  | W | WR |
| PS | WR | W |  |  |  |  |  | W | WR |
| ZE | WR | W |  |  |  |  |  | W | WR |
| NS | WR | W |  |  |  |  |  | W | WR |
| NM | WR | W |  |  |  |  |  | W | WR |
| NL | WR | W |  |  |  |  |  | W | WR |

HEAD POSITION ERROR

FIG. 6

W = INHIBIT WRITE
R = INHIBIT READ

| HEAD VELOCITY | I | PL | PM | PS | ZE | NS | NM | NL | I |
|---|---|---|---|---|---|---|---|---|---|
| PL | WR | WR | WR | WR |  |  | WR | WR | WR |
| PM | WR | WR | WR | W |  |  |  | WR | WR |
| PS | WR | WR | W |  |  |  |  | WR | WR |
| ZE | WR |  |  |  |  |  |  | WR | WR |
| NS | WR |  |  |  |  |  | W | WR | WR |
| NM | WR |  |  |  |  | W | WR | WR | WR |
| NL | WR | WR | WR | WR | WR | WR | WR | WR | WR |

HEAD POSITION ERROR

PREDICTIVE READ-WRITE INHIBIT DECISION USING FUZZY LOGIC

BACKGROUND OF THE INVENTION

1. Field of the Invention

This invention relates to the positioning control of the read-write head in a rotating disk data storage device and, more particularly, to a positioning method and apparatus that reduces hard and soft error rates during data storage disk operation.

2. Discussion of the Related Art

Rotating disk data storage devices are widely used in the art, offering rapid data file access for reading and writing. These rotating data stores include magnetic disk memories using servo-actuator driven magnetic head assemblies to access rotating magnetic platters. They also include the newer optical disk memory employing a laser read-write head assembly to access write-once or read-mostly rotating optical disks. The present state of the art for magnetic data storage disk files can be appreciated by referring to, for instance, Comstock, et al., "Data Storage on Rigid Disks (Chapter 2)", *Magnetic Recording, Vol. 2: Computer Data Storage,* (Mee, et al., Eds.), McGraw Hill Book Company, New York, 1988.

The method for reading and writing information to the concentric data tracks in a rotating disk file is subject to data errors arising from head tracking errors that occur during data storage to the file and during data retrieval from the file. A method known in the art for reducing both hard (written) and soft (read) errors during writing and reading from a storage device is to define a track centerline and establish limited offtrack regions about each track centerline on the disk. The use of write offtrack limit (WOL) and read offtrack limit (ROL) is known in the art for magnetic and optical electromechanical storage devices. In principle, the offtrack method provides a threshold measure for inhibiting the read or write function of the head assembly. That is, the write function is inhibited (disabled) when the head position exits the inner or outer WOL. By preventing the writing of information by a recording head during an overlap into an adjacent track arising from a large position error, this limit avoids "hard" or nonrecoverable data errors. The WOLs define a "write limit width" for the track. Head position errors greater than half of this write limit width will force a positive write inhibit decision.

Similarly, when the head position exits the read limit region bounded by two predetermined ROLs, the head read function is inhibited to prevent "soft" errors during the read operation.

The problem in the art is that these offtrack limits are static limits that cannot accommodate changes in head-disk dynamics during read and write operations. For instance, the relative velocity between the data storage track and the head assembly is not considered in the read-write inhibit decision. The fixed offtrack limits can lead to reduced data transfer efficiency because of a tendency for the head assembly to bounce back and forth across the limits during track-following operation under some circumstances with the methods known in the art. Repeated read operations needed to correct soft errors can significantly slow data transfer rates.

Practitioners in the art have developed many useful techniques for improving the steady-state track-following operation in a rotating disk storage device. For instance, in U.S. Pat. No. 4,554,652, Maeda et al. disclose an optical information processor that ascertains radial movement of the optical read-write spot with respect to the track centerline using conventional split threshold methods. Maeda et al provide means for inhibiting the optical writing operation in response to optical head position errors beyond a certain Write Offtrack Limit.

In U.S. Pat. No. 4,730,290 Takasago et al. disclose a tracking error detecting circuit for detecting a laser beam position error from the centerline of a data storage track in an optical read-write data storage device. Takasago et al inhibit optical writing after a position error threshold is first exceeded for a first predetermined time and the offtrack condition next continues for a second predetermined time that is longer than the first predetermined time.

In U.S. Pat. No. 4,839,751, Revels discloses a fine positioning scheme for a track-following servo-actuator in a disk file. Revels teaches a two-threshold tracking method where head position errors that violate either a near-boundary or a far-boundary for one of several prescribed time intervals are interpreted to indicate whether the head assembly is "on-center" or not and to logically exclude noise and other error conditions affecting the "on-center" indication. Revels provides for variation in threshold timing intervals to accommodate noise variations but does not consider inhibit decision modification responsive to changes in head position error or velocity.

In U.S. Pat. No. 4,954,907, Takita discloses an improved head positioning control system for track-following in a data recording disk file. Takita teaches the use of a head velocity detector for determining head velocity with respect to the data storage track centerline. He then computes a new servo-actuator input current signal based on changes in incremental head position and velocity and the previous servo-actuator input current. Takita's teachings rest on the assumption that any change in head acceleration that is not reflected in driver current changes must be entirely a result of shock or vibration. His system operates to damp the effects of such unwanted accelerations. Takita does not consider any novel read-write inhibit decisions for reducing hard or soft errors during his novel track-following procedure.

Because of the prevailing practice of using hard threshold read-write inhibit techniques in rotating data storage files, there is a strongly felt need for improved track-following methods that will reduce soft error rates and improve data transfer efficiency during the read and write operations. The related unresolved problems and deficiencies are solved by this invention in the manner described below.

SUMMARY OF THE INVENTION

This invention improves the soft error rate through the application of fuzzy logic technology to the read-write inhibit control strategy. The essential elements of the inhibit controller of this invention are the lexical or linguistic control rules relating the two concepts of fuzzy implication and the compositional rule of inference. That is, the inhibit controller provides a fuzzy logic process that converts the lexical control rules arising from expert knowledge into an automatic control strategy. A set of lexical or linguistic control rules is converted to an automatic control strategy through the use of IF . . . THEN type logic statements.

This invention is based in part on the recognition that the improved read-write inhibit strategy of this invention can be described as a set of lexical control rules. These rules are then converted into an automatic control or decision strategy and thereby implemented in fuzzy logic as an inhibit controller. The resulting fuzzy controller process, which may include multiple inputs and outputs, appears as a multi-dimensional look-up table.

The improved read-write inhibit strategy of this invention is based on the recognition that head velocity estimates from head position error information monitored over time are unexpectedly useful for improving data transfer efficiency. The read-write inhibit decision of this invention is made in response to both head position error information and head velocity information. The method of this invention for developing the inhibit decision from the head position error and head velocity information preferably uses a fuzzy logic approach to convert lexical rules to an automatic control table, but may also be implemented with conventional bilevel logical techniques.

It is an object of this invention to reduce the soft error rate during the read operation by improving the read inhibit decision procedure, thereby improving data transfer efficiency. It is another object of this invention to avoid all hard errors during the write operation without reducing data transfer efficiency by improving the write inhibit decision procedure. It is a feature of this invention that both soft and hard error rates are improved through the use of a simple inhibit control technique incorporating both head position error and head velocity information as inputs.

The foregoing, together with other features and advantages of this invention, will be become more apparent when referring to the following specification, claims and accompanying drawing.

BRIEF DESCRIPTION OF THE DRAWING

For a more complete understanding of this invention, reference is now made to the following detailed description of the embodiments illustrated in the accompanying drawing, wherein:

FIG. 5 shows the read-write inhibit decision strategy resulting from lexical rules which are based only on head position;

FIG. 6 shows the read-write inhibit decision strategy resulting from the lexical rules of this invention for the fuzzy set membership functions of FIGS. 3 and 4;

DETAILED DESCRIPTION OF THE PREFERRED EMBODIMENTS

Principles of Fuzzy Logic

Figure 1:
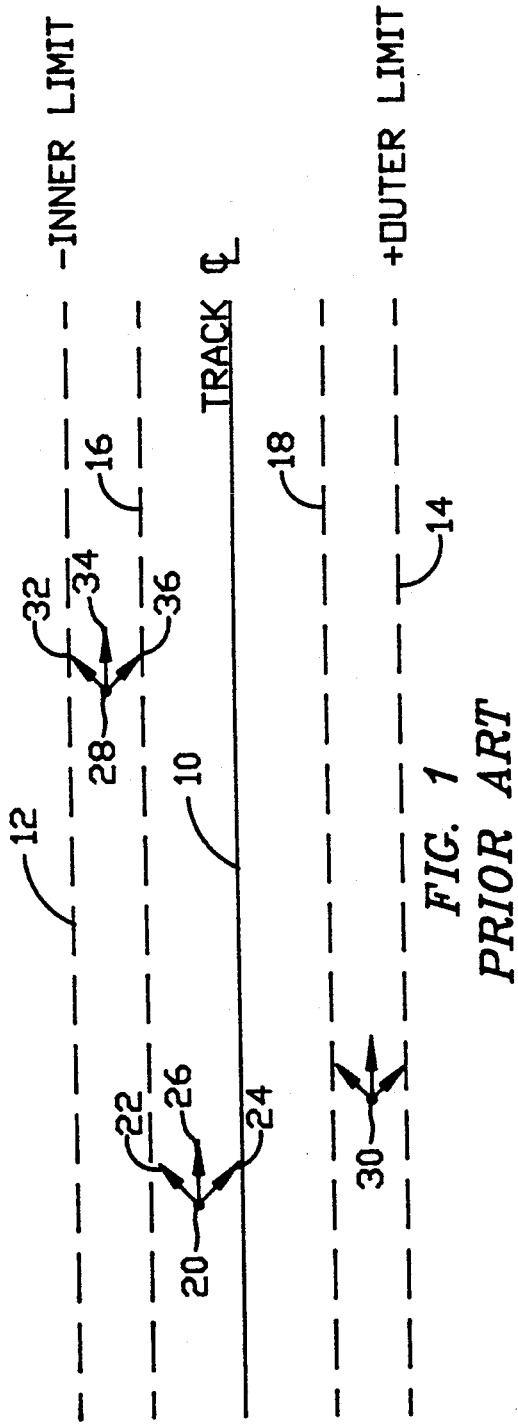
FIG. 1 shows the inner and outer offtrack limits of a data storage track from the prior art.

This invention involves the application of fuzzy logic techniques to the read-write inhibit decision process. While fuzzy logic methods are known, they have not been applied to the rotating disk storage file art until now. Fuzzy logic is an extension of traditional bilevel logic. While bilevel logic requires a statement or condition to be either completely true or completely false, fuzzy logic permits partial truth and partial falseness. Fuzzy logic is derived from the more general theory of fuzzy sets. The degree of membership of a variable value in a fuzzy set can range from zero to unity with zero indicating null membership in the set and unity indicating full membership in the set. This function is exemplified in FIG. 2 for head position error and head velocity membership in an "inhibit" set of all errors or velocities for which an inhibit decision must be made.

The mathematical precision of fuzzy sets derives from the precise mapping of input values to degrees of membership. The linguistic power of fuzzy logic lies in its ability to define and manipulate sets that contain varying degrees of membership without the burden of considering all possible combinations of values. The only thing vague about fuzzy logic is the linguistic expression of a problem and its solution, not the numeric representation. A vague or general linguistic expression of a problem permits the user to develop and refine a numerical representation without requiring consideration or understanding of a detailed numeric model. Fuzzy logic can be applied to complex logical and combinatorial problems for which numerical models are impossible because of the enormous number of possible combinations.

A fuzzy logic system differs from a traditional expert system in that it has far fewer rules to evaluate. A fuzzy logic system should act to maintain the illusion that all rules in its rule base are simultaneouly evaluated. This means that complex real-time systems having large numbers of random interrupts are not suitable for fuzzy logic solutions. Only systems having smoothly-varying inputs or outputs are generally suitable for fuzzy logic solutions.

Fuzzy logic membership functions for several variables can be combined to form new membership functions using operators similar to those known for bilevel logic operations. The standard fuzzy operations are AND, OR and NOT, which correspond respectively to the INTERSECTION, UNION and COMPLEMENT operations for fuzzy sets. These three fuzzy operations provide new membership functions valued according to the minimum membership degree for AND, the maximum membership degree for OR, and one minus the degree of membership for the NOT function. That is, the membership degree of A and B in a fuzzy set is the lesser of the two individual degree values for the same set, and so on. Reference is made to Zadeh, "Fuzzy Logic", IEEE Computer, April 1988, pp. 83-93, for a general discussion of the fuzzy logic art and for additional references.

A fuzzy logic system is normally implemented using these three fuzzy logic operators to describe one or more lexical rules established by the designer. An example of a lexical rule is "IF displacement is positive small AND the rate of change of displacement is zero, THEN the driving force is negative small". (from Maski Togai, "An Example of Fuzzy Logic Control", Computer Design, March 1, 1991, p. 93).

In U.S. Pat. No. 4,930,084, Osaka, et al. disclose a vehicle control system based on the implementation of a fuzzy logic auto cruise control apparatus. Osaka et al provide a useful background discussion of the application of fuzzy logic techniques to electronic control system designs but do not consider rotating disk file art.

The Heat-Tracking Problem

FIG. 1 illustrates the geometry of the concentric data storage track from the prior art. The track is nominally located at track centerline 10 and has a finite width bounded by offtrack limits for the read and write operations. The Read Offtrack Limits (ROLs) are illustrated as the inner ROL 12 located toward disk center (not shown) and the outer ROL 14 located toward disk edge (not shown). ROLs 12 and 14 define a read limit width about track centerline 10. Similarly, the inner Write Offtrack Limit (WOL) 16 and outer WOL 18 define a write limit width about track centerline 10. The write limit width is usually narrower than the read limit width because write operations outside the offtrack limits can result in unrecoverable or "hard" errors while read operations outside such limits are "soft" and may be recovered by rereading the data during the next revolution of the disk. These soft errors merely slow data transfer rates without causing loss of data.

As can be appreciated with reference to the Comstock et al reference cited above, the read-write head (not shown) is forced to follow track centerline 10 as best as possible during a revolution of the disk. FIG. 1 shows three possible motion vectors at three different head locations to illustrate possible head-track position and velocity relationships.

For instance, consider the three head-track velocity vectors at head position 20. The vector 22 represents negative or inward motion of the head with respect to track centerline 10. The vector 24 represents positive or outward motion of the head with respect to the track centerline 10 and the vector 26 represents no relative motion between head and track centerline 10. Similar vectors are illustrated for the two other head positions 28 and 30.

At head position 20, the head is well within both ROLs 12 and 14 and WOLs 16 and 18. If the head moves according to the vector 22, then it is moving closer to negative WOL 16 but no inhibit action is immediately required unless it is moving rapidly. Motion at vector 24 improves the head position error at the next sample or sector and motion at vector 26 retains the status quo. Thus, at head position 20, no inhibit decision is required except for high velocities at vector 22.

Head position 28 is close to inner ROL 12 and outside of inner WOL 16. Thus, a write inhibit decision should have been made before the head position error exceeded inner WOL 16 rather than waiting until head position 28 is detected. Also, if vector 32 is high velocity, a read inhibit decision is predictable. In the prior art, no provision is made for either such type of predictive inhibit decision. Similarly, the vector 34 at head position 28 implies no prediction of a read inhibit decision but must be treated cautiously. Finally, outward vector 36 actually improves the marginal position situation and requires no inhibit decision.

The three motion vector examples at head position 30 lead to similar conclusions by this reasoning. Note that the outward vector improves the situation at head position 28 whereas the inward vector improves the situation at head position 30, requiring additional sophistication in any logical decision strategy using head velocity as an input.

These observations made in connection with FIG. 1 demonstrate that the absolute head position error value is not as useful to the inhibit decision process as a combination of head position error and relative head velocity (the time derivative of position error). This second combination improves the inhibit decision strategy by permitting the prediction of position error threshold crossings before generation of soft (or hard) data errors.

The Invention

The method of this invention expresses the read and write strategies as one or more linguistic control rules. A properly defined strategy is then converted into an automated control or decision scheme and implemented in a Fuzzy Logic Controller (FLC). Such a FLC procedure, which may have multiple inputs and outputs, may be expressed as a multi-dimensional look-up table.

Figure 2:
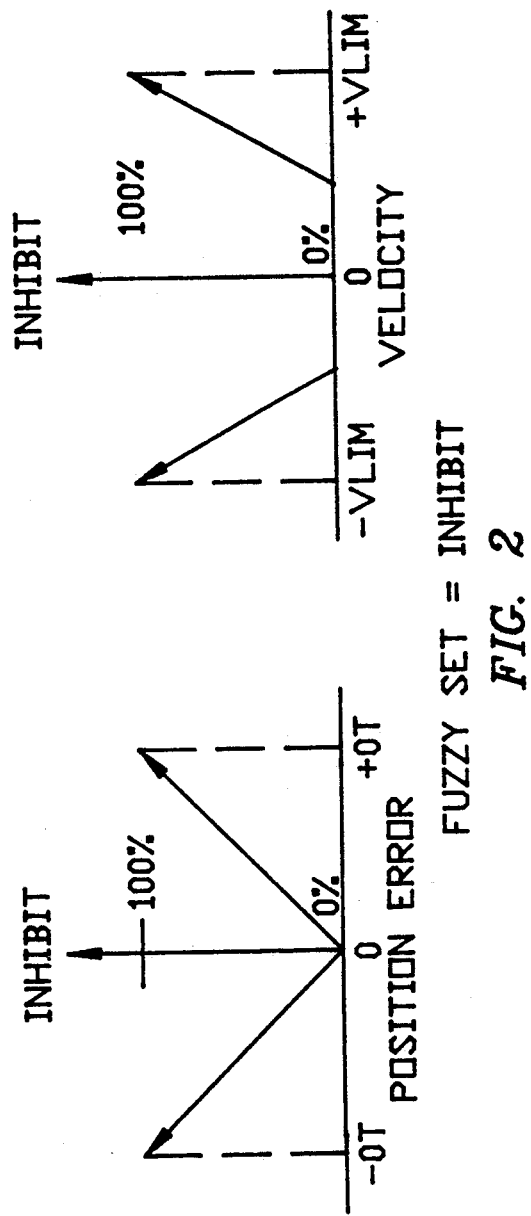
FIG. 2 provides two illustrative fuzzy set membership functions for head position error and head velocity.
Figure 3:
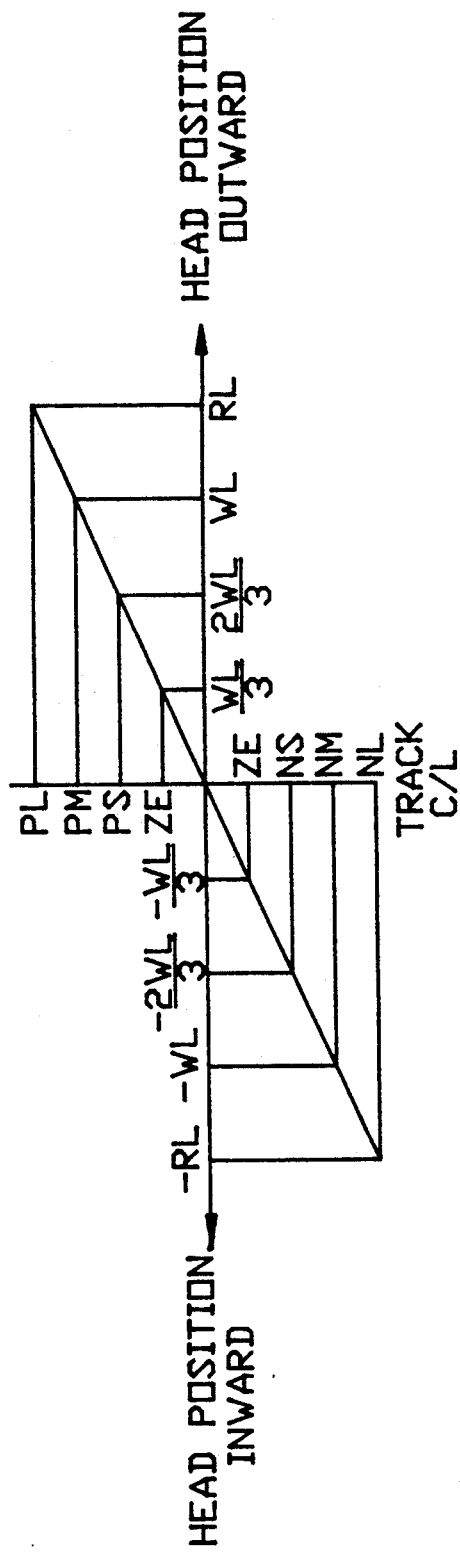
FIG. 3 illustrates the head position fuzzy set membership function preferred for this invention.
Figure 4:
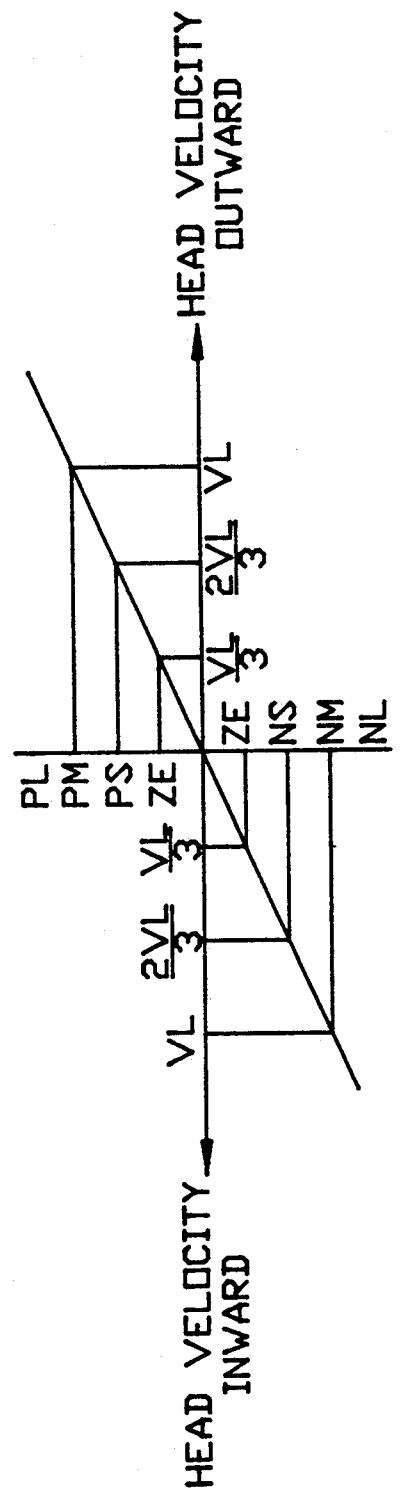
FIG. 4 illustrates the head velocity fuzzy set membership function preferred for this invention.

The first step in describing the necessary lexical rules for this invention is to establish a fuzzy set membership function for the head position error and head velocity discussed above. FIG. 3 provides an illustrative fuzzy set membership function for head position error and FIG. 4 provides an illustrative fuzzy set membership function for head velocity. These two functions are preferred for this embodiment but may easily be modified in form with similar useful effect. FIG. 2 provides another example of two such functions relating position and velocity to an "inhibit" decision.

In FIG. 3, the horizontal axis represents the head position relative to track centerline and extends inward to the left and outward to the right. The RL axis labels represent the read offtrack limit and the WL axis labels represent the write offtrack limit. WL is divided into thirds on both sides of the track centerline as shown. For example, the WL/3 distance 38 represents one-sixth of the width between ±WL. The distance between RL and WL is not necessarily related to the width of the region between ±WL.

The vertical axis in FIG. 3 is labelled with a series of two-letter symbols representing the fuzzy regions assigned to the corresponding head position error values shown. For instance, the "nearly zero" region is labelled ZE and represents the inner third of the width between ±WL. The PS and NS labels represent Positive and Negative "small error" regions beyond the first third and inside the last third of the width between ±WL. The PS region is located outward of the track centerline and the NS region is located inward of the track centerline.

Similarly, PM and NM represent a "medium error" region for head position errors located in the outer one third of the WOL region. Finally, "large errors" are labelled PL and NL, representing head position errors beyond the WOLs that are still within the ROLs. Membership may also be defined for head position errors beyond the ROLs for particular design considerations.

Referring to FIG. 4, similar fuzzy set definitions are provided for the time derivative of head position error, head velocity. Head velocity is related to a track-following velocity limit, VL. VL is divided into thirds and each region is labelled using the same nomenclature as was discussed above in connection with FIG. 3. That is, "almost zero" is labelled ZE and represents the inner third of the VL region, "small velocities" are labelled NS and PS representing the middle third of the VL region, and "medium velocities" are labelled NM and PM representing the outer third of the VL region. Again, the positive sign is assigned to outward velocity and the negative sign is assigned to inward velocity with respect to the track centerline.

If head velocity falls in the range of PL or NL ("large velocities"), the cause is likely to be an external mechanical shock or vibration because the track-following servo control mechanism does not normally move the head more rapidly than VL. Accordingly, there is some uncertainty about operating conditions when head velocity is "large" and both read and write inhibit decisions could be made under such circumstances. No provision for this exists in the prior art.

FIG. 5 illustrates a two-dimensional decision table based on the set membership functions of FIGS. 3 and 4 using fuzzy logic lexical rules which use only head positions to control the read-write inhibit decision. The horizontal axis includes two positions at the extremes labelled "I" to represent head position errors beyond the ROLs. Such head positions result in automatic inhibition of both write and read operations, as illustrated in FIG. 5. Similarly, the PL and NL columns represent head position errors outside of the WOLs for which the write inhibit decision is always made in this table. Thus, the PL and NL columns are uniformly filled with "W" symbols representing write inhibition.

FIG. 6 shows the two-dimensional table from FIG. 5 with the inhibit decisions resulting from the lexical rules preferred in this invention. Note that the inhibit decisions in the columns labelled "I" are identical to those from the prior art, as they should be. Note that the use of head velocity in the inhibit decision process permits both the read and write functions to be inhibited for all "large velocities" in the rows labelled PL and NL. This feature is a result of the method of this invention incorporating the time derivative of head position error together with the head position error in the inhibit decision process. Finally, note that the inhibit decisions in the other columns vary according to a complex pattern that results from the lexical rules underlying the inhibit decision strategy.

Recalling the above discussion in connection with FIG. 1, note that "large head position errors" (columns PL and NL) require no inhibit decision when the head velocity is oriented toward the track centerline. That is, no inhibit decision is predicted or necessary when head position error and head velocity are of opposite sign. This refinement is not available in the prior art because head velocity is not considered.

Inhibit decisions for read and write are more quickly made when head velocity and head position error are of the same sign, thereby predicting an increasing problem in the immediate future. Thus, for combinations of large and small or medium and medium position error and velocity, both read and write inhibit decisions are made if velocity and position are in the same direction. This represents another lexical rule used to define the necessary inhibit controller logic.

Finally, for combinations of medium and small position error and velocity in the same direction, no read inhibit decision is made but the write inhibit decision is made because of a clear prediction of eventual risk of overwriting outside of the WOLs.

The table in FIG. 6, the set membership functions in FIGS. 4 and 5, and the above related discussion are intended as illustrative examples of the effects of using the fuzzy logic membership functions and lexical rules preferred for this invention. The division of position error and velocity regions into thirds is convenient but arbitrary and these methods are just as suitable for quarter or decimal divisions.

Figure 8:
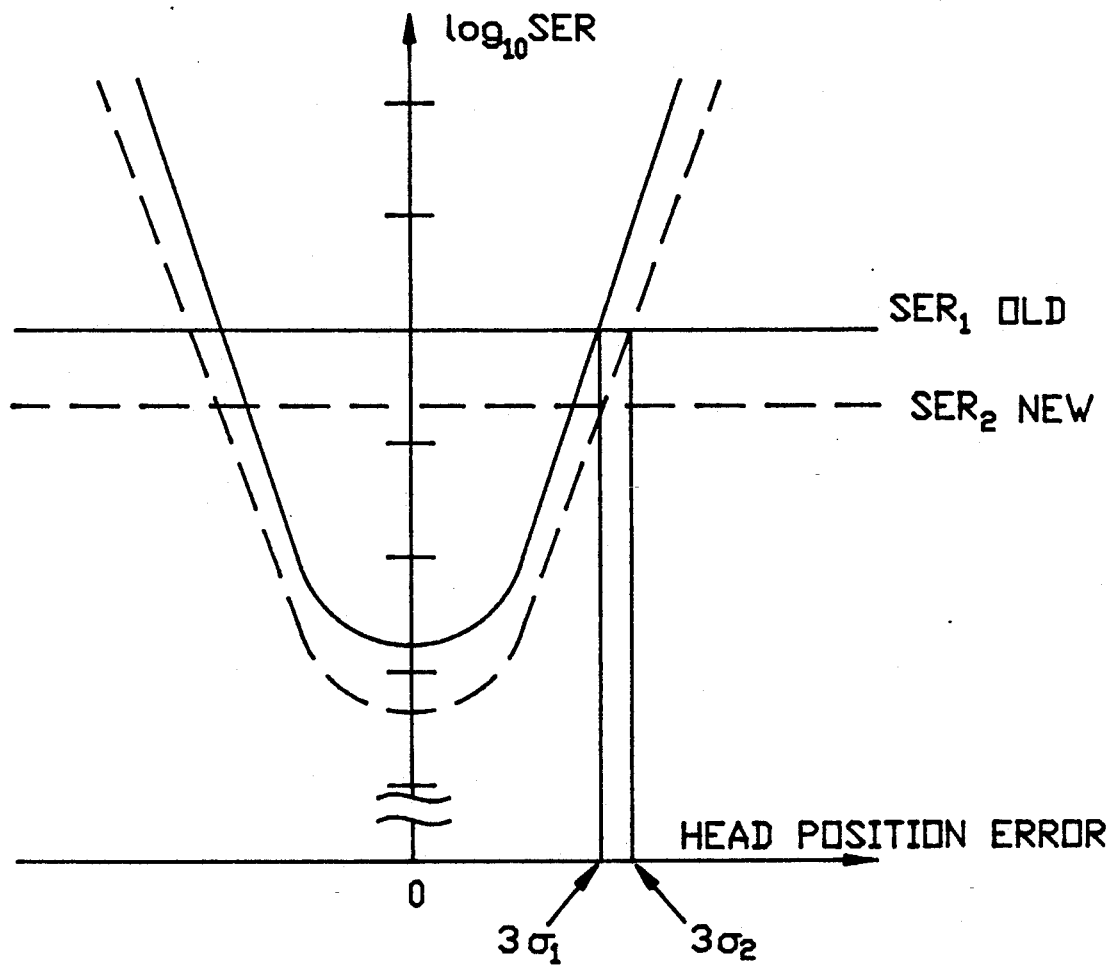
FIG. 8 shows the Soft Error Rate (SER) improvement arising from the read-write inhibit strategy of this invention.

Soft Error Rate (SER) performance is illustrated in FIG. 8 where the solid line ($SER_1$) represents the SER of the prior art and the dotted line ($SER_2$) represents the improved error rate of this invention. FIG. 8 shows the SER as a function of head position error. $SER_1$ can be either maintained over a wider ROL region ($3\sigma_2$) or can be improved to $SER_2$ over the ROL region ($3\sigma_1$).

Figure 7:
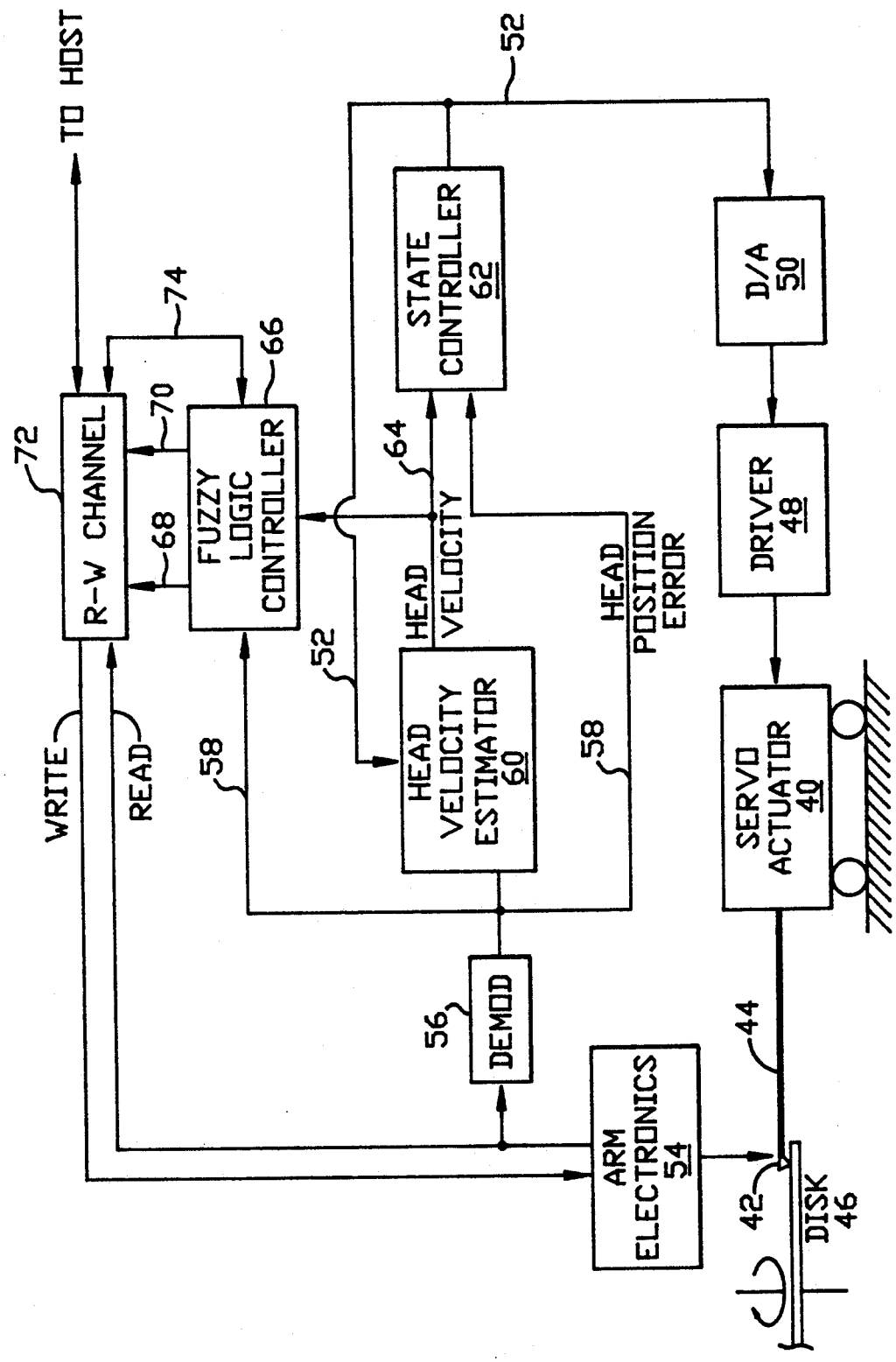
FIG. 7 provides an illustrative embodiment of the apparatus of this invention.

FIG. 7 presents a conceptual implementation of the predictive read-write inhibit decision apparatus of this invention. In FIG. 7, a conventional head positioning servo-actuator 40 is shown connected to a head assembly 42 by means of the suspension 44. Head 42 is disposed in close contact with a disk 46 and is positioned by action of servo-actuator 40 in response to the output of a driver 48.

Driver 48 provides a current or voltage output that is proportional to the output from a digital-to-analog (D/A) converter 50. The input to D/A converter 50 is a state control output signal 52.

Track position information on disk 46 is sensed by head 42 and transferred through the arm electronics 54 to a demodulator 56. The head position error signal 58 is generated by demodulator 56 and presented to a head velocity estimator 60 and to the state controller 62, which complete a servo feedback loop. Both estimator 60 and controller 62 may be implemented in a single microprocessor.

Estimator 60 generates an estimated head velocity signal 64 from the time rate of change of head position error signal 58. Head velocity signal 64 is routed to state controller 62 for use in generating state control output signal 52.

A Fuzzy Logic Controller (FLC) 66 is coupled to this servo loop in the manner shown. FLC 66 functions as an inhibit controller, which could also be based on bipolar logic known in the art. The fuzzy logic implementation is preferred.

FLC 66 produces the two read and write inhibit decision signals 68 and 70 in response to head velocity signal 64 and head position error signal 58 inputs. FLC 66 is controlled from the R-W channel 72 by data line 74. The character of read inhibit signal 68 and write inhibit signal 70 can be determined from inspection of FIG. 6.

This invention represents the first known application of fuzzy logic control methods in a Direct Access Storage Device (DASD). The fuzzy logic control scheme is limited herein to the read-write inhibit decision logic. Other DASD control logic may also be amendable to fuzzy logic techniques.

The method of this invention improves SER because of improved offtrack detection and prediction capacity. It also reduces potential hard error conditions arising from inter-track squeezing. The improved SER results from the capability to predict offtrack head positioning before it occurs. The method of this invention also prevents read or write problems during extreme external shock and vibration and may be used to generate an advisory signal to the host before loss of data occurs.

The functions of FLC 66 can be incorporated with those of state controller 62 into a single microprocessor with the necessary memory for the FLC functions.

Obviously, other embodiments and modifications of this inventions will occur readily to those of ordinary skill in the art in view of these teachings. Therefore, this invention is to be limited only by the following claims, which include all such obvious embodiments and modifications when viewed in conjunction with the above specification and accompanying drawing.

We claim:

1. A method for controlling the read-write error rate in a recording disk file of the type having a read-write head means and a plurality of data storage tracks, each said track bounded by inner and outer read offtrack limits (ROLs) separated by a ROL width and inner and outer write offtrack limits (WOLs) separated by a WOL width, said limits disposed about a track centerline, wherein said head means has a head position error with respect to said centerline and is connected to a servo-actuator means for moving said head means inward or outward with respect to each said track over a track-follow velocity range having an upper head velocity magnitude limit (VML), said method comprising the steps of:

establishing a first fuzzy set membership function defining the degree of membership of said head position error in a first fuzzy set;

establishing a second fuzzy set membership function defining the degree of membership of said head velocity in a second fuzzy set;

combining said first and second fuzzy set membership functions according to a first lexical rule to form a read inhibit decision function;

combining said first and second fuzzy set membership functions according to a second lexical rule to form a write inhibit decision function;

generating a read inhibit signal in response to a value of said read inhibit decision function greater than a first threshold;

generating a write inhibit signal in response to a value of said write inhibit decision function greater than a second threshold; and inhibiting the read and write functions of said head means in response to the corresponding said read and write inhibit signals.

2. The method of claim 1 wherein:

said first lexical rule is to inhibit said write function if either one of said head position error or said head velocity is at least medium and the other is at least small in the same direction inward or outward; and said second lexical rule is to inhibit said read function if said head velocity is large, or if said head velocity is at least small and said head position error is large in the same direction inward or outward, or if both said head position error and said head velocity are medium in the same direction inward or outward.

3. The method of claim 2 wherein:

said first fuzzy membership function value is around zero for said head positions within one-sixth of said WOL width of said centerline, positive small for said head positions from one-sixth to one-third of said WOL width outward of said centerline, negative small for said head positions from one-sixth to one-third of said WOL width inward of said centerline, positive medium for said head position errors from one-third to one-half of said WOL width outward of said centerline, negative medium for said head position errors from one-third to one-half of said WOL width inward of said centerline, positive large for said head positions from said outer WOL to said outer ROL, and negative large for said head positions from said inner WOL to said inner ROL; and said second fuzzy membership function value is around zero for said head velocity magnitudes less than one-third of said VML, positive small for outward head velocities between one-third and two-thirds of said VML, negative small for inward head velocities between one-third and two-thirds of VML, positive medium for outward head velocities between two-thirds and three-thirds of said VML, negative medium for inward head velocities between two-thirds and three-thirds of said VML, positive large for outward head velocities greater than said VML and negative large for inward head velocities greater than said VML.

4. The method of claim 3 wherein said data storage tracks are for storing magnetic data and said head means is for reading and writing magnetic data in said data storage tracks.

5. The method of claim 1 wherein said data storage tracks are for storing magnetic data and said head means is for reading and writing magnetic data in said data storage tracks.

6. The method of claim 1 wherein said data storage tracks are for storing optical data and said head means is for reading and writing optical data in said data storage tracks.

7. A data recording disk file of the type having at least one rotatable disk with substantially concentric data storage tracks, a head means for reading and writing data in said tracks during disk rotation, a servo-actuator means attached to said head means for causing said head means to follow a specific data storage track in response to a driver signal, a signal conditioner and driver means for providing said driver signal in response to a state controller output signal, and demodulator means for deriving and generating a head position error signal, said disk file further comprising:

estimator means for generating a head velocity signal in response to said state controller output signal and said head position error signal;

state controller means for generating said state controller output signal in response to said head velocity signal and said head position error signal;

inhibit controller means for generating a read inhibit signal and a write inhibit signal in response to said head velocity signal and said head position error signal; and read-write channel means for inhibiting said read and write functions of said head means in response to said read and write inhibit signals.

8. The disk file of claim 7 wherein said inhibit controller means comprises:

fuzzy logic means for converting said head velocity signal and said head position error signal into said write inhibit signal according to a first lexical rule; and fuzzy logic means for converting said head velocity signal and said head position error signal into said read inhibit signal according to a second lexical rule.

9. The disk file of claim 8 wherein:

said first lexical rule creates a write inhibit signal output when either one of said head position error or said head velocity signal is at least medium and the other is at least small in the same direction inward or outward; and said second lexical rule creates a read inhibit signal when said head velocity is large, when said head velocity signal is at least small and said head position error signal is large in the same direction inward and outward, and when both said head position error signal and said head velocity are medium in the same direction inward or outward.

10. The disk file of claim 9 wherein said data storage tracks are for storing magnetic data and said head means is for reading and writing magnetic data in said data storage tracks.

11. The disk file of claim 7 wherein said data storage tracks are for storing magnetic data and said head means is for reading and writing magnetic data in said data storage tracks.

12. The disk file of claim 7 wherein said data storage tracks are for storing optical data and said head means is for reading and writing optical data in said data storage tracks.

13. In a recording disk file of the type having at least one read-write head means, at least one recording disk including a plurality of data storage tracks, each of said data storage tracks bounded by inner and outer read offtrack limits (ROLs) separated by a ROL width and inner and outer write offtrack limits (WOLs) separated by a WOL width, said limits disposed about a track centerline, head position error means for measuring a head position error with respect to a centerline, a servo-actuator means responsive to said head position error for moving said head means inward or outward with respect to each track of said plurality of data storage tracks over a track-follow velocity range having a upper head velocity magnitude limit (VML), a method for controlling the disk file's read-write error rate, the method employing:
 a rule-based controller means for making read and write inhibit decisions in response to a velocity of said head means with respect to a track centerline and to a position of said head means with respect to said track centerline;
 the method including the steps of:
 generating a head velocity signal representing a time rate of change of a position of said head means with respect to a centerline of a disk storage track;
 providing said head velocity signal to said rule-based controller means;
 at said rule-based controller means, generating a write inhibit signal in response to a head velocity signal indicating a head velocity oriented away from said centerline; and
 preventing writing on said track by said head means in response to said write inhibit signal.

14. In a recording disk file of the type having at least one read-write head means, at least one recording disk including a plurality of data storage tracks, each of said data storage tracks bounded by inner and outer read offtrack limits (ROLs) separated by a ROL width and inner and outer write offtrack limits (WOLs) separated by a WOL width, said limits disposed about a track centerline, head position error means for measuring a head position error with respect to a centerline, a servo-actuator means responsive to said head position error for moving said head means inward or outward with respect to each track of said plurality of data storage tracks over a track-follow velocity range having a upper head velocity magnitude limit (VML), a method for controlling the disk file's read-write error rate, the method employing:
 a rule-based controller means for making read and write inhibit decisions in response to a velocity of said head means with respect to a track centerline and to a position of said head means with respect to said track centerline;
 the method including the steps of:
 generating a head velocity signal representing a time rate of change of a position of said head means with respect to a centerline of a disk storage track;
 providing said head velocity signal to said rule-based controller means;
 at said rule-based controller means, generating a read inhibit signal in response to a head velocity signal indicating a head velocity oriented away from said centerline; and
 preventing reading from said track with said head means in response to said read inhibit signal.

* * * * *

UNITED STATES PATENT AND TRADEMARK OFFICE
CERTIFICATE OF CORRECTION

PATENT NO. : 5,270,880

DATED : December 14, 1993

INVENTOR(S) : Ottesen et al

It is certified that error appears in the above-indentified patent and that said Letters Patent is hereby corrected as shown below:

```
Column 5, line 11, please replace "heat-tracking" with
    --Head-Tracking--.

Column 9, line 31, please replace "read" with --write--; and
Column 9, line 34, please replace "write" with --read.
Column 9, line 2, please replace "inventions" with --invention--.
```

Signed and Sealed this

Fifth Day of July, 1994

Attest:

BRUCE LEHMAN

Attesting Officer

Commissioner of Patents and Trademarks